United States Patent [19]

Goldsworthy

[11] Patent Number: 5,285,613
[45] Date of Patent: Feb. 15, 1994

[54] PULTRUDED JOINT SYSTEM AND TOWER STRUCTURE MADE THEREWITH

[76] Inventor: W. Brandt Goldsworthy, 2504 Calif. 90274; David W. Johnson, 1884 Sunset Blvd., San Diego, Calif. 92103.

[21] Appl. No.: 828,499

[22] Filed: Jan. 31, 1992

[51] Int. Cl.$^5$ .................................... E04H 12/10
[52] U.S. Cl. .................................... 52/648.1; 52/646; 52/651.01; 52/282.1; 403/255; 403/171; 256/65
[58] Field of Search ............... 52/282.1, 282.2, 282.3, 52/651.01–651.09, 648.1, 649.1, 649.2, 650.1, 650.07, 646; 403/205, 255, 191, 171, 173; 256/22, 65, 73

[56] References Cited

U.S. PATENT DOCUMENTS

| | | | |
|---|---|---|---|
| 3,712,005 | 1/1973 | Eschbach et al. | 52/282.3 |
| 3,776,650 | 12/1973 | Zenhausern | 403/191 |
| 3,973,756 | 8/1976 | Lauzier | 256/65 |
| 3,984,962 | 10/1976 | Krohn | 52/651.07 |
| 3,989,397 | 11/1976 | Baker | 403/205 |
| 4,036,371 | 7/1977 | Michel | 403/171 |
| 4,055,318 | 10/1977 | Duckett | 403/171 |
| 4,065,890 | 1/1978 | Fenner | 403/173 |
| 4,073,477 | 2/1978 | Walters | 256/22 |
| 4,369,953 | 1/1983 | Greiner et al. | 256/73 |
| 4,485,597 | 12/1984 | Worrallo | 403/255 |
| 4,556,337 | 12/1985 | Marshall | 403/255 |

Primary Examiner—Carl D. Friedman
Assistant Examiner—Winnie Yip
Attorney, Agent, or Firm—Ralph S. Branscomb

[57] ABSTRACT

This joint system is provided primarily for connecting elongated structural members which are made of materials which deter the use of conventional fastening techniques, and specifically for joining pultruded composite structural members composed of, for example, glass fibers and resins. The joint system in the first embodiment includes an elongated pultruded member which defines one or two re-entrant slots along its entire length, with the interior structure defining the walls of the slot or slots being configured to cooperate with the inserted seating end of another composite length such that when the length is inserted into one of the slots, the slot is first expanded slightly and then the walls of the slot snap back to lock with cooperating structure of the other structural member. In a second embodiment a sleeve-like equivalent of the slot configuration is set forth and lastly, a high-voltage power line tower constructed with the joint coupling as its central feature is described.

12 Claims, 5 Drawing Sheets

PULTRUDED JOINT SYSTEM AND TOWER STRUCTURE MADE THEREWITH

BACKGROUND OF THE INVENTION

The invention is in the field of pultruded composites, a field in which the inventors have been working for years, and each of the inventors has a number of patents to his credit. Pultruded composites, that is, elongated members formed by pulling bunched fibers such as glass fibers through a resin bath and then through a die, have been used most extensively to form simple stick-like products. For example, many ax handles and hammer handles are pultrusions, and the number of pultruded reflective highway delineating posts must be in the millions. A utility pole of composite construction is illustrated in U.S. Pat. No. 4,803,819, issued Feb. 14, 1989.

The structural members which this disclosure details could be made from a wide variety of reinforcement fibers and matrix binders. The fibers could be glass, Kevlar ™ or carbon, to name just three, and the matrix could be a thermoplastic such as polypropylene or a thermoset resin such as a polyester, a vinylester, or epoxy.

By their nature, pultruded composites have a potential for use in a great many fields and products. The nature of the resin and the fibers that are used in any particular pultrusion may be almost infinitely varied to produce wide variations in such different characteristics as modulus of elasticity, electrical or heat conductivity or resistance, resistance to ultraviolet light, resistance to the aging effects of certain chemicals, and so forth.

By the nature of the manufacturing process, pultrusions can be made in an unlimited variety of shapes, from a simple hollow or solid stick or beam to a configuration with a complex cross-section created by a combination of dies and mandrels. Although all manufacturing processes require some maintenance, with pultrusions, once the initial die is made, the pultrusion can be made continuously twenty-four hours a day with little expense other than the direct materials and production costs. Obviously, this process is ideal for producing elongated members that have complex cross-sections but which are used on an ongoing and virtually unlimited basis.

Pultrusions are also characterized by having a relatively high strength and moderate cost when glass fibers are used, and having a good strength-to-weight ratio when configured in appropriate cross-sections.

Compared to steel, which is the most common structural material in use, pultruded composites offer decided advantages as enumerated above, including virtual immunity to corrosion, non-conductivity, and in many applications about the same strength-to-weight ratio and cost-to-strength ratio. For these reasons, there have been efforts over the last few years on the part of the instant inventors and others to move the use of structural composites more into the mainstream where their advantages may be realized to a fuller extent. For example, one of the instant inventors has built vehicle-carrying railroad cars virtually completely from composites.

There is an area in which composites must be treated quite differently from steel. When steel is bolted, as is usually the case in field assembly, the bolt holes reduce the net area at the joint. Nontheless, bolt holes can be placed close together without concerns of tearout, or bearing strength failure. Thus, angled steel towers may have 10 or more bolts at a joint face, closely spaced to each other. Because of low bearing strength in composites, bolts cannot be spaced nearly as closely as in steel construction and bearing area becomes a critical design issue.

Consequently there is a need for effective coupling means between pultruded composite structural members. Coupling means need be provided to couple members of different cross-sectional shapes and sizes which meet one another at different angles in three dimensions. The luxury of being able to position a flange or produce a bolt hole virtually anywhere on the member, inherent in the use of steel, does not exist for composites. The challenge, therefore, is to create coupling means which are as orientationally versatile as possible and capable of joining two widely different member configurations, while at the same time being as strong, light-weight, compact and inexpensive as possible.

SUMMARY OF THE INVENTION

The instant invention meets the above-stated challenge by providing, in two basic embodiments, coupling means used to join structural members including large structural members of different size and cross-sectional configuration and extending from one another at different angles.

The coupling of the instant invention is a product of the need for a coupling system to produce tower structures, such as high tension power line towers, radio and television broadcast towers, microwave towers, and so forth. Structures of this nature are constructed from large vertical leg members which take the compressive loads of the structure, together with a reinforcing lattice made up of smaller braces to prevent buckling of the large vertical members.

Typically, the tower would be square or rectangular in cross-section, with four large, vertical, compressive load members defining the four corners of the square or rectangle, and the lattice defining a central grid structure between the four corner members. The principle challenge of the instant coupling is to couple the continuous high-load vertical corner members which are of relatively large diameter and wall thickness, to the smaller bracing members which form the reinforcing grid.

Although applicable to a wide variety of structures, the invention is described in the context of high-voltage power transmission towers, which at present are made primarily of steel. Irrespective of the material of which the vertical compression members are made, Euler's buckling formula is used to determine whether a particular member is adequate to resist the buckling compressive forces on the column. The portion of Euler's formula which includes the variables of interest here is expressed as follows:

$$\frac{EI}{L^2}$$

where:

E = the modulus of elasticity;
I = the moment of inertia; and
L = the unsupported length between nodes or intersections on that column.

Because pultruded composite construction is being used to replace steel angle in the construction of these towers, the buckling formula is applied to both materials in order to assist designing composite columns which replace steel columns. The principle parameter that affects this substitution is the "E" factor in Euler's formula, the modulus of elasticity. The modulus of elasticity (rigidity) is about 30 mil. PSI for steel, compared to 3 mil. PSI for a typical composite pultrusion. In other words, from the outset, the top of Euler's formula is ten times as great for steel as it is for composites.

To compensate for this, the moment of inertia (I) is maximized in composites. This means the production of large-diameter hollow tubes, as such configuration produces the greatest moment of inertia with the least mass and material cost. A circular cylindrical column maximizes this consideration, with square or rectangular columns also having a relatively high "I," all columns being hollow, and all such columns having a moment of inertia considerably superior to a similar column that is L-shaped.

The other variable in Euler's formula is the unsupported length between nodes (L). This would suggest that a composite tower which utilizes large-diameter hollow columns to provide the compressive support for the weight of the tower, would benefit from use of a low-cost internal truss or grid structure which provides relatively closely spaced support braces to reduce unsupported lengths of the main columns.

These are the primary considerations behind the design of the coupling of the instant invention, which is produced in two basic forms. In the first coupling the joint system requires that the vertical column itself be defined with a continuous parallel-walled slot entrant into one side of the column. The parallel walls of the slot into the column are pultruded to define opposing tangs which snap into appropriately positioned notches milled into the seating ends of the smaller transverse structural members, that are in turn inserted into the slot in the main column to create the joint. Opposite the entrance to the slot in the main column is a seating trough which snugly seats the ends of the transverse members.

This configuration enables a column to be reinforced at any number of points and at any selected spacing along its length with transverse support members. The transverse members may enter the slot either perpendicularly to the column axis, i.e. the support member is horizontal, or the support member may be oriented at 45 degrees or at some other angle above or below the horizontal, with the seating end of such members having been fabricated specifically to accommodate entrance into the column at such angles. Cover members may be snapped into place between lateral support members so that an open slot is not created between the transverse support and in addition, by using these cover members the configuration of the lateral support members is pre-established by the lengths and sequence of the cover members.

The first embodiment, with only a single longitudinal slot, limits the direction of extension of the secondary members to a single vertical plane. This is somewhat restrictive for a member which will be used as the corner beam in a tower that will generally have a rectangular planform. To overcome this limitation, a variation of the first embodiment is disclosed in which the first slot is substantially duplicated at 90 degree orientation around the post relative to the first slot, so that the post can serve as the corner post for such a structure, and have connecting support lattice beams exiting the posts along both orthogonal sides of the supporting grid.

In a second embodiment of the invention, a sleeve is used which encircles the main column and provides a slot which, similar to the slot in the first embodiment, receives and locks in the seating end of a transverse member. The sleeve concept has the advantage over the continuous slot of the first embodiment in that it may be swiveled around and oriented at any angle about the vertical axis of the main column, whereas in the first embodiment the transverse member may exit only in the direction dictated by the position of the slot in the main column.

Various combinations and permutations of these joint systems can be used to create the composite tower of the invention.

BRIEF DESCRIPTION OF THE DRAWINGS

FIG. 2a is a horizontal section taken parallel to and just below the section of FIG. 2, at line 2a—2a;

FIG. 5 is a section taken along line 5—5 of FIG. 4;

DETAILED DESCRIPTION OF THE PREFERRED EMBODIMENT

Figures 1, 2, 3:
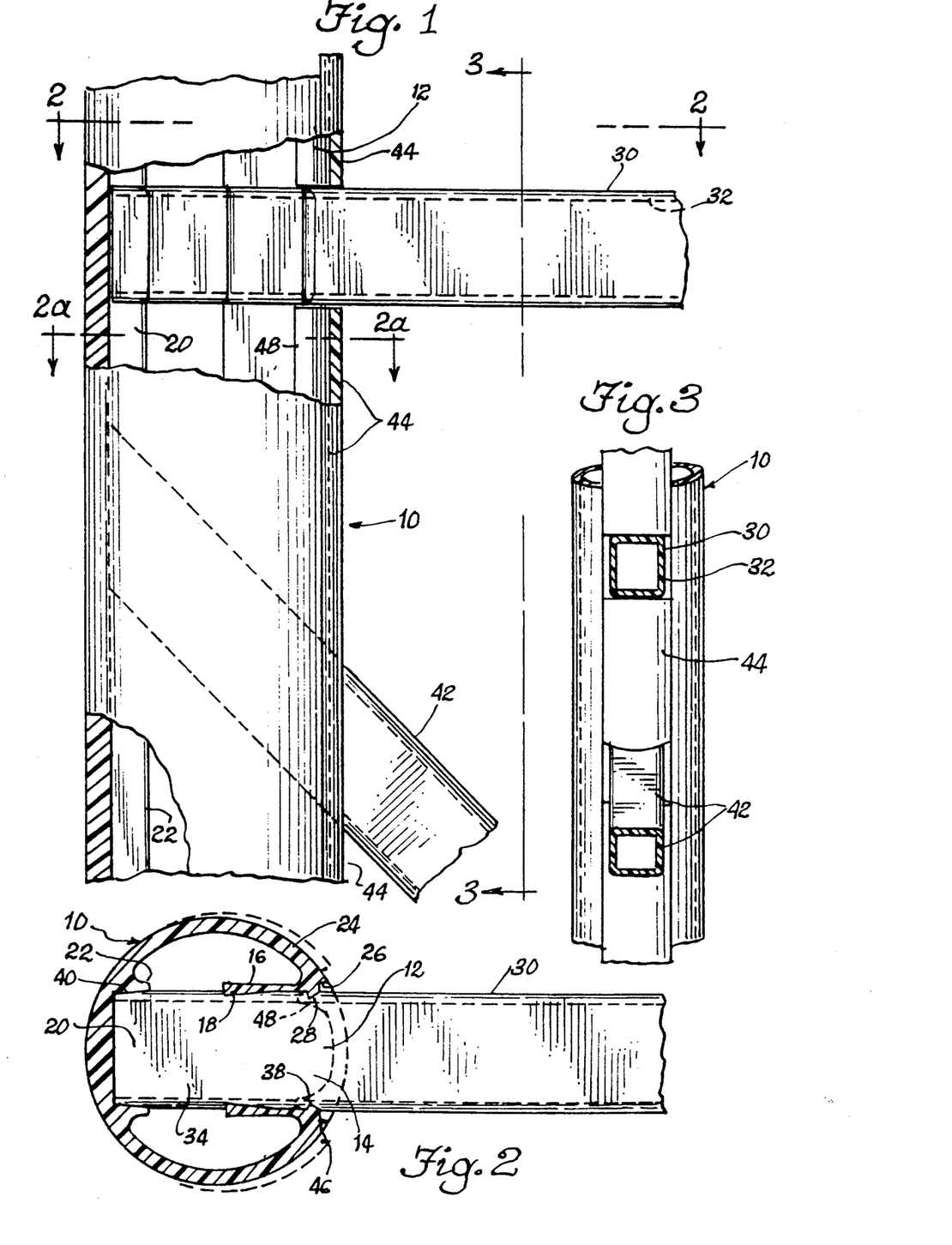
FIG. 1 is a side elevation view, partially in section and partially in phantom, illustrating a continuously slotted column seating a horizontal transverse structural member, and a transverse member inserted at about a 45 degree angle below the horizontal.
FIG. 2 is a section taken along line 2—2 of FIG. 1.
FIG. 3 is a section taken along line 3—3 of FIG. 1.
Figures 2A, 5:
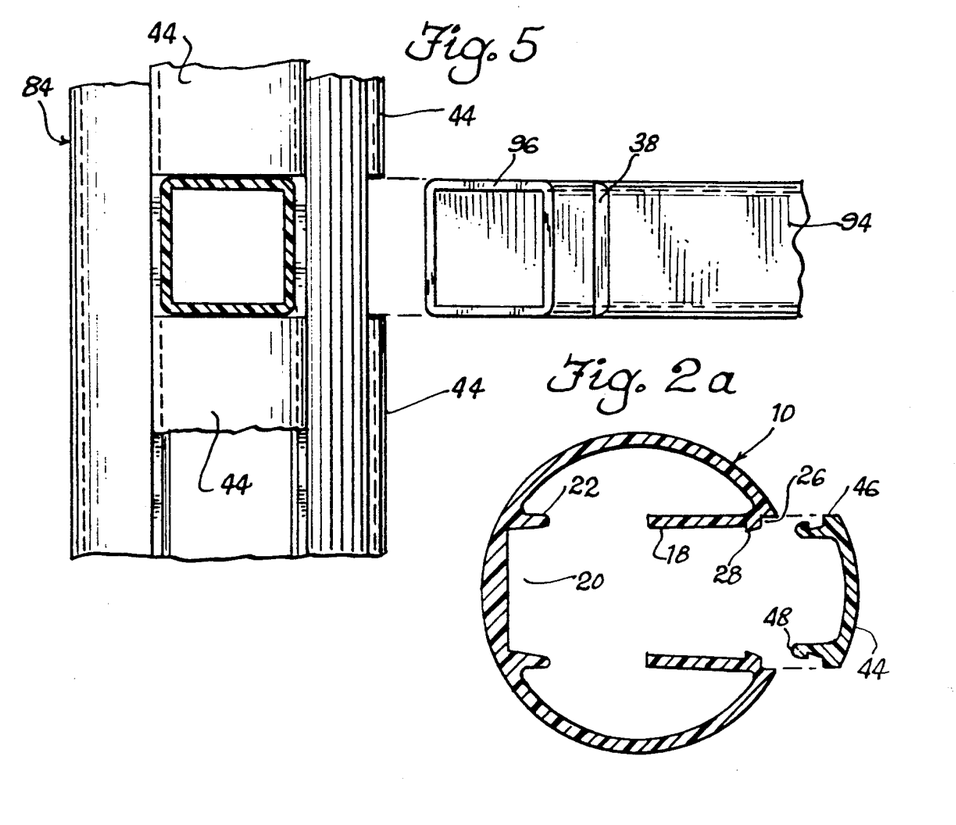

The first embodiment of the invention is shown in FIGS. 1 through 3, with the first structural member 10 taking the form of a cylindrical column as can be seen from the cross-sections of FIGS. 2 and 2a. The concept of the first embodiment is to provide a column with a continuous longitudinally extended slot 12 with an entryway 14. The material of the column forms substantially parallel, re-entrant slot walls 16, each of which in turn defines an inwardly facing tang 18. A continuous seating trough 20, defined between ramps 22, is formed along the entire interior of the column structure.

The outer wall 24 of the column defines shoulders 26 adjacent the slot entryway 14 and a second pair of inwardly directed tangs 28 just inside the entryway.

All of this structure extends the entire length of the column because it is pultruded from a single die. Thus although the interior configuration of a column is somewhat complicated for a structural member, once the die and the mandrels have been created for the column, indefinite lengths of it may be produced without incurring further tooling costs.

Figure 18:
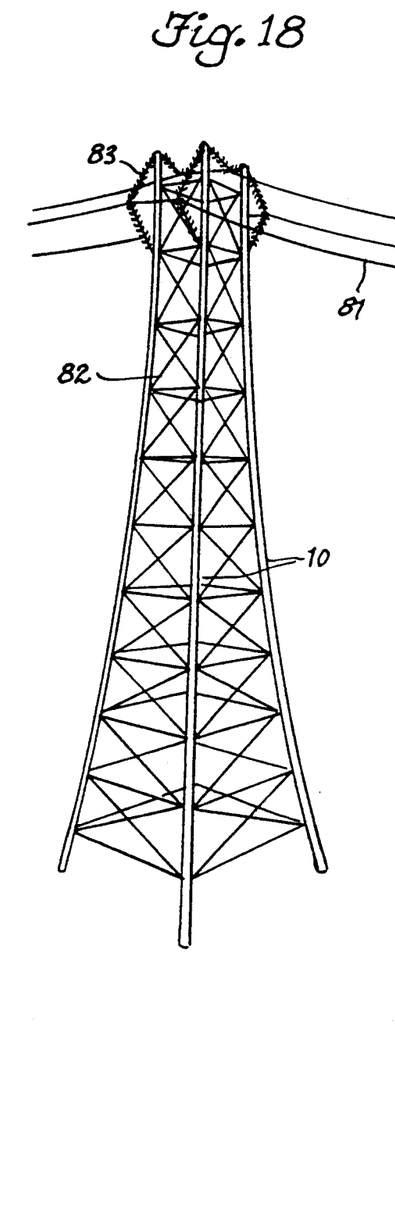
FIG. 18 is a perspective view of a tower made from pultruded composites coupled according to the present invention.

The first structural member 10 would ordinarily be relatively wide, on the order of five to ten inches in outside diameter and with a wall thickness of $\frac{1}{4}''$ to $\frac{3}{4}''$. This is the member that will provide the vertical compression strength and define the vertical posts of the tower. Due to its large diameter and relatively thick wall, it has a high moment of inertia to resist buckling. The overall positioning of the column in a tower structure is shown in FIG. 18, in which four of the columns 10 are used at the edges of the tower.

A second structural member 30 is jointed to the first structural member 10 to stabilize the column 10 against buckling. Ordinarily, but not necessarily, this member would be hollow as shown in FIGS. 1 through 3 and rectangular with walls 32 thick enough to prevent collapse of these support members without adding excessive weight to the structure. Although shown as a hollow square tube, this member can also be an I-beam or a C-channel, or for that matter any configuration whatsoever provided the seating end is properly shaped.

Figures 6, 7, 8, 9, 10, 11, 12, 13, 14:
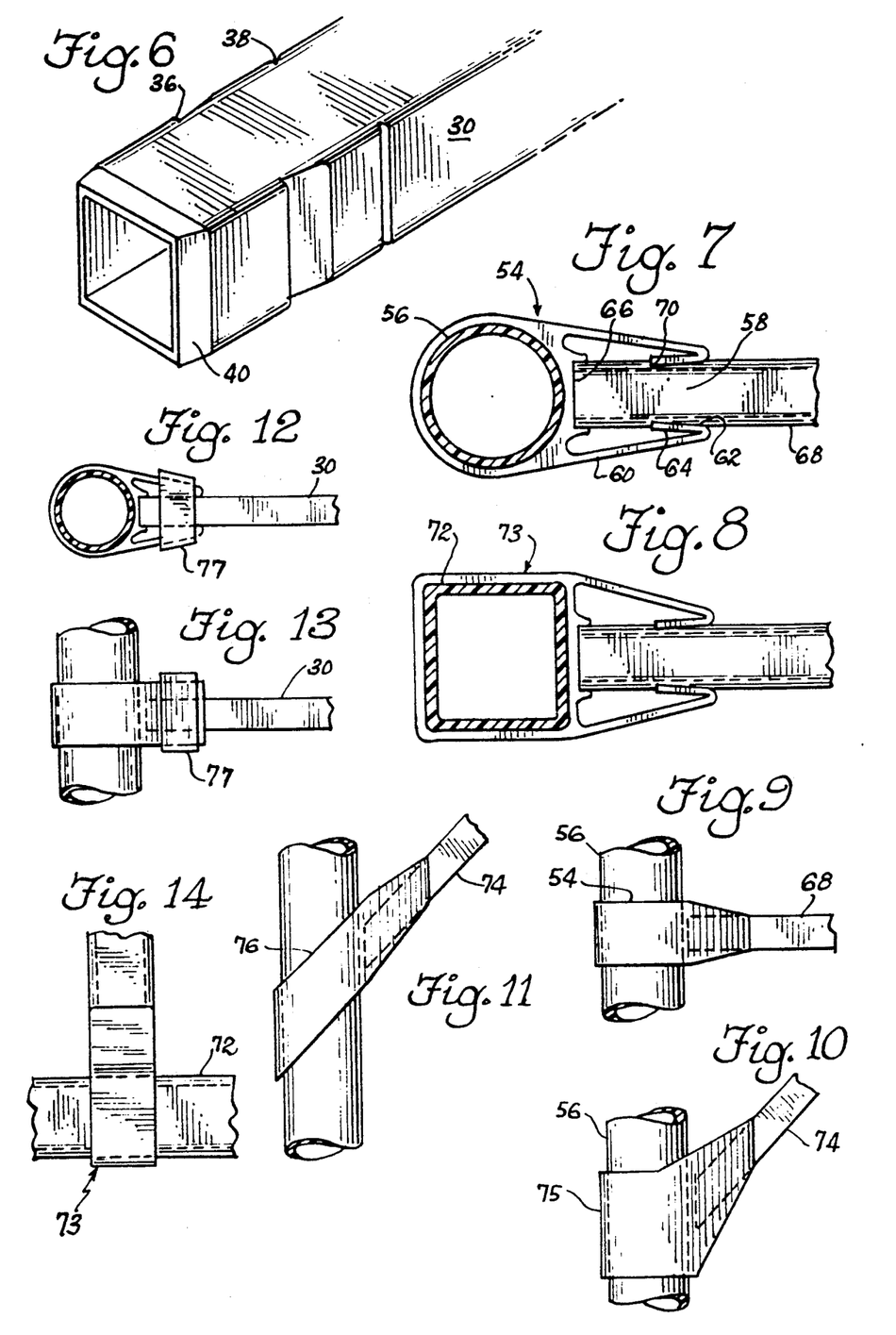
FIG. 6 is a perspective view of the seating end of an orthogonally inserted transverse members.
FIG. 7 is a horizontal section taken through a cylindrical column illustrating an alternative embodiment of the coupling system utilizing a sleeve which slips onto the column and snap-mounts the inserted end of a cross-member.
FIG. 8 illustrates is a horizontal cross-section similar to FIG. 7 but illustrating the same type of sleeve but mounted on a square column.
FIG. 9 is a side elevation view of the sleeve and column of FIG. 7.
FIG. 10 is a side elevation similar to FIG. 9 but of a modified form of the sleeve which holds a diagonal brace.
FIG. 11 is a side elevation view of a coupling similar to that of FIG. 10 but showing yet another modified form of the sleeves.
FIG. 12 is a top section view similar to that of FIG. 7, but showing the use of a coupling collar to hold the beam and sleeve together.
FIG. 13 is a side elevation view of the configuration of FIG. 12 illustrating the use of a coupling collar.
FIG. 14 is a side elevation view of a joint formed between two rectangular tubes of the type illustrated in FIG. 8.

At least one end of the second structural member is a seating end 34 which is snapped into the slot 12 of the column 10 as best shown in FIG. 2. The seating end of the second structural member is provided with a pair of opposed notch sets 36 and 38 as seen in FIG. 6. The tip of the seating end is tapered as indicated at 40. If desired the seating end of this member could be an insert plug acting as an extension to the main hollow length of this member, or a reinforcing insert wall could be forced into the hollow end of the structural member to provide adequate thickness to enable the notches 36 and 38 to be milled into the seating end of this member without unduly weakening the structure. Alternatively and most simply, the wall thickness of this member relative to notch depth would be such that the notches would not overly weaken this member.

Structural member 30 is pushed into the slot 12 into the position indicated at FIG. 2, with the tapered tip 40 seated into the trough 20, and the tangs 18 and 28 seated in the notch pairs 36 and 38 respectively. As the member is forced into the slot, the walls 24 of the column 10 expand as indicated in phantom in FIG. 2, with the internal slot walls 16 also deflecting to permit the second structural member to seat in the seating trough 20, allowing the tangs 18 to snap into place in the grooves.

It should be noted that this construction takes advantage of the low modulus of elasticity inherent in the composite construction of the instant invention. Whereas this modulus of elasticity makes it necessary to utilize a somewhat larger diameter member, it also permits the detent construction described above in which snap-in positive detent action is achieved with large structural members, which would not be possible with steel.

It will be noted that whereas the structural member 30 is inserted into the trough via slot 12 of the column orthogonally to the column axis, non-orthogonal angles are possible. A brace 42 inserted at a diagonal angle of about 45 degrees is shown at 42 in FIGS. 1 and 3. This brace terminates at a seating end substantially like that shown in FIG. 1, except that of course the appropriate notches would have to be cut at the appropriate diagonal angle and the tapered tip 40 would also conform to this diagonal angle. This is a major advantage of the slotted column construction, that is, braces can be snapped into place at any reasonable angle above or below the horizontal just like the brace 42.

There is a third member of the jointing system illustrated in FIGS. 1 through 3, and that member is the cover plate 44. This member has the cross-section shown in FIGS. 2 and 2a and can be seen in side elevation in FIG. 3. The cover also snaps into the entryway 14 of the slot in much the same way as does the structural member 30. As shown in FIGS. 2 and 2a, its edges 46 seat against the shoulders 26 so that the external contour of the column is maintained as an uninterrupted cylinder. Two continuous retainers 48 engage the tangs 28 as shown in FIGS. 2 and 2a. It should be noted that the tangs and retainers are somewhat exaggerated for clarity in these drawings, and that ordinarily the retainers 48 would be capable of some inward deflection, so that a combination of expansion of the slot walls and compression of these hooked retainers will enable the cover to be snapped into place.

When creating a configuration as shown in FIG. 1, the first step would be to put in the bottom-most cover plate 44, shown below the brace 42 in that figure. Once the bottom cover plate is in, the brace 42 is forced into place into the slot and then tapped down over the cover plate, seating over the top edge of the plate. Subsequently, an additional cover plate is snapped in above the brace 42 and tapped into place, and then the structural member 30 is pushed into the slot and tapped down over the cover plate, and so forth, so that as one builds up, an unlimited variety of arrangements of braces separated by cover plates are possible. This would aid alignment on assembly, but is not a requirement.

An additional effect of the use of the cover plates is that it has a significant impact on the actual construction of structures with these members. That is, if the second structural members and the cover members are to be assembled in a particular sequence, provided the members are numbered or the sequencing otherwise identified, assembly is pre-determined and is virtually fool-proof. Provided the construction workers follow the sequence, each crossbeam will engage the post 10 at exactly the proper elevation on the post because it will be supported at that elevation by the covers beneath the crossbeam. Provided the proper beams are used in the proper sequence, the entire construction is pre-established, and can be accomplished with a crew having minimal construction experience.

All of the three members discussed in respect to the first embodiment are pultruded composites according to the present construction. The qualities of these materials has been taken advantage of in this design. The resilience of these materials permits positive engagement between two members with a snap-in action. In addition, parts that would be expensive to make on a piece-by-piece basis are economically produced as the pultrusion process permits indefinite lengths to be made without significant additional tooling costs.

The second embodiment is shown in FIGS. 7 through 17. This embodiment uses the same slotted member concept, but rather than defining the slot into the cylindrical column member directly, a sleeve 54 is produced which encircles the cylindrical tube 56, with the slot 58 actually being defined by outwardly-directed walls 60 which double back at 62 to define tangs 64. The main cylindrical structural member thus maintains its structural integrity.

A seating trough 66, similar to seat 20, accommodates the end of the structural member 68, also referred to as the "second structural member," but differing slightly from the brace 30. The brace 68 need not be tapered at its end, and simply defines a pair of inwardly-directed, opposed slots 70 to enable the tangs 64 to snap in place when the brace 68 is pressed into the slot.

Figures 15A, 16:
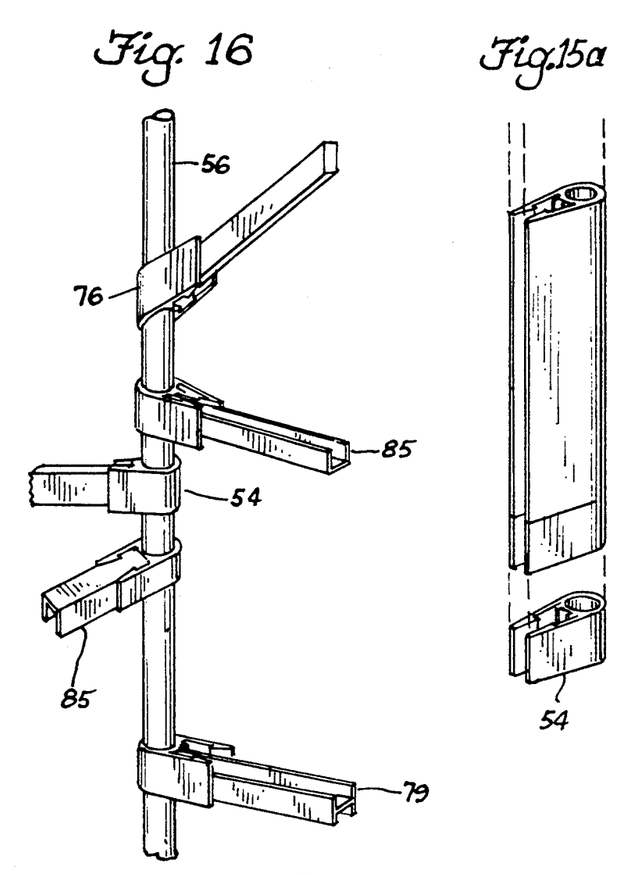
FIG. 15a illustrates a pultrusion used to cut sections for the sleeve illustrated in FIG. 7, illustrating the angle of the cut.
FIG. 16 is a perspective view of a column illustrating the sleeve coupling construction used with several types of beams extending out at several different angles from the main column.

As shown in FIG. 16, one major advantage of the sleeve construction is that the sleeve can be oriented in any rotated direction around the cylindrical axis of the main structural member. If necessary, the sleeve may be rigidified around the member with epoxy, becoming essentially as strong as though the entire unit were one piece.

The intent that the sleeve is a pultrusion is an central concept of the invention. This does not mean, however, that the fibers of the pultrusion of the sleeve, or any of the other pultrusion members disclosed herein, are necessarily all longitudinally extended. The fiber structure can be any desired combination of fiber forms, such as woven fiber fabric or a fiber mat laid orthogonally or bias-oriented. Transverse fiber cords and bands and any other form in which the raw fiber is produced, can be used with or without longitudinal fibers to create enormous omnidirectional toughness.

For this reason, none of the pultruded members are susceptible to splitting along the grain as might be the case were longitudinal fibers used exclusively. The exact combination of fiber forms used in any piece is subject to variation and adjustment to accommodate different circumstances, but the sleeve would generally have a substantial cross-fiber content and would be extremely tough, and certainly not subject to fracturing along any primary grain orientation direction.

FIGS. 7 through 14 are illustrations, in some cases diagrammatic, of variations of the sleeve construction described with reference to FIG. 7. FIG. 8 differs only in that the central beam 72 is square and the sleeve 73 is correspondingly square. FIG. 9 is actually a side elevation view of FIG. 7, and FIG. 10 illustrates a sleeve 75 which is cut from the same pultruded length as the sleeve 54 but along different planes to accommodate a diagonal brace 74 instead of an orthogonal brace as shown in FIGS. 7 through 9. FIG. 11 illustrates brace 74 of FIG. 10 but with a diagonal-cut sleeve 76.

FIGS. 12 and 13 illustrate the simplest form of orthogonal junction utilizing normal-cut ends, and illustrating the use of a restraining collar 77 that prevents the crossbeams 30 from slipping out of the sleeve.

Figure 17:
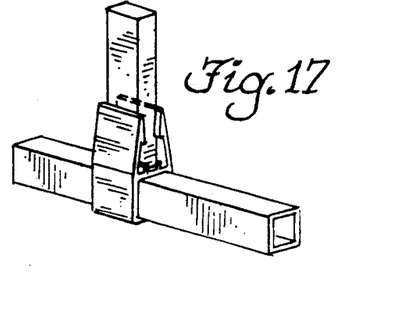
FIG. 17 is a perspective view of the coupling shown in FIGS. 8 and 14 in which both coupled members are rectangular in cross-section.

FIG. 16 illustrates in perspective a number of different brace configurations on the same central column, with FIG. 17 illustrating the possibility of a brace-to-brace construction. These two figures make it clear that virtually any kind of lattice configuration can be achieved with these sleeves, be it brace-to-brace, cylindrical column to brace, rectangular lattice or diagonal bracing in concert with a reticulated grid. Hollow beams, I-beams 79, C-channels 85, and even less common configurations such as Z-beams will work.

Figure 15B:
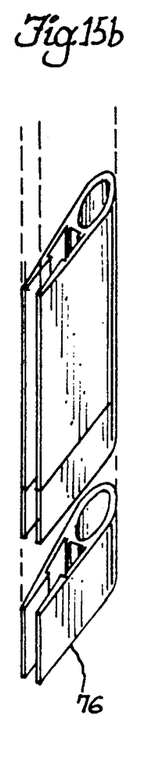
FIG. 15b illustrates the same pultrusion shown in 15a but cut at different angles to produce a slightly different sleeve.
Figure 15C:
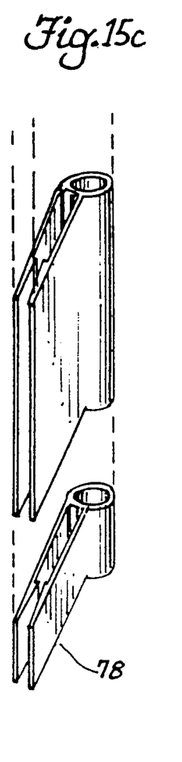
FIG. 15c is again the same pultrusion as FIGS. 15a and 15b but cut at different angles to produce a different coupling sleeve.

FIGS. 15a, 15b and 15c illustrate the continuous pultrusions for the sleeves 54, 76 and 78 as they would appear, as segments are cut off to define the individual sleeves before the walls 60 are tapered to achieve the configuration in these figures. These pultrusions are diagrammatically illustrated, and are actually all the same except for the fact that they are cut along different planes. The pultrusion of FIG. 15a is cut straight across to define the sleeve 54, and in FIG. 15b and 15c the member is cut into rectilinear/diagonal slices.

Figure 19:
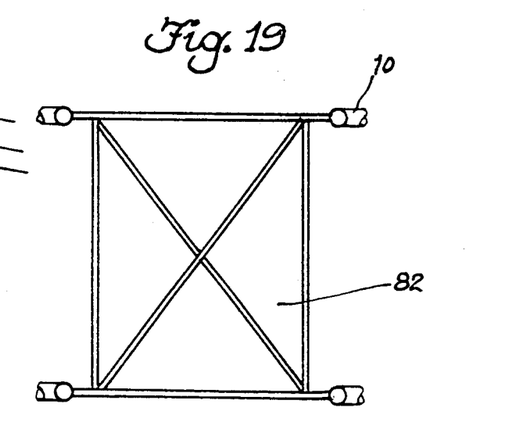
FIG. 19 is a diagrammatic illustration of the platform of FIG. 19.

It can be seen by the above description that the tower configuration such as shown in FIG. 18 can be easily fabricated using the jointing systems described above. The central grid 82 connects to the corner columns, which are either the structural members 10 or 56, depending on which system is used. The central grid can utilize interlocking connections of one of the instant inventors as referenced in U.S. Pat. No. 5,024,036. The vertical columns of FIG. 18 are shown as being arched in a somewhat exaggerated fashion. The actual degree of arch will be very minor, and would conform to the natural deflection of the columns under the weight they would support. The basic cross-sectional configuration could be, for example, as illustrated in FIG. 19, with opposed column pairs being arched toward one another, or a radial pattern shown in FIG. 20 could be achieved. The point is, by utilizing the jointing systems as described, virtually any tall frame structure can be created, using relatively large diameter columns supported by an interior lattice as described and illustrated herein.

Figure 20:
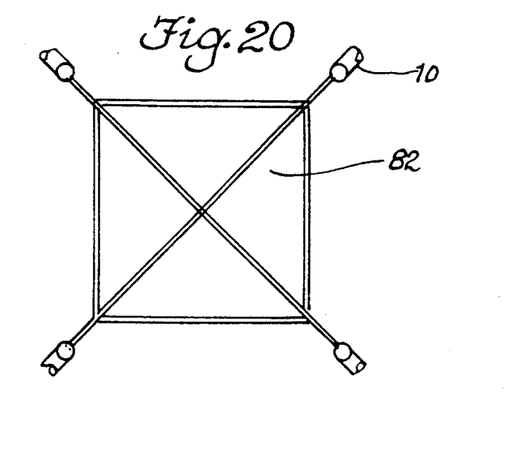
FIG. 20 is a diagrammatic illustration of a slightly modified platform of a tower such as that shown in FIG. 19 but with radially-directed brace connectors; and, FIG. 21 is a cross-section of a modification of the first structural member to receive two support members inserted at right angles in the horizontal plane.

Back to the tower of FIGS. 18-20, one of the advantages of the composite tower lies in the fact that the high-voltage conductors can be brought closer together because the composite construction reduces EMF and flashover potential. For this reason, the conductors 81 shown in FIG. 18, which are generally suspended through insulators on laterally extended crossarms, can now have their insulators 83 connected directly to the tower as indicated. The insulators each generally comprise a central, rigid glass rod with a series of spaced flashover-preventing disks or sheds mounted along the length of the rod. Two rigid insulators are usually required, to form two-point suspension, and there are several likely points of attachment on the tower as indicated in FIG. 18.

Although it is clear that the joint embodiment of FIGS. 1 through 3 could be effectively used to create the tower of FIGS. 18 through 20, it should also be clear from a review of those figures that the configuration is constrained somewhat by the fact that the first structural members 10, that is the corner posts, have only a single slot 12 defined in their sides, which both dictates the angle at which the transverse support beams meet the posts, and also requires that only one plane of intercoastal bracing can be utilized, although other connecting techniques can be used to join the bracing, as mentioned earlier. FIG. 19 clearly illustrates this limitation.

It is intuitively clear from an examination of FIG. 19 that it would be advantageous to have cross-members exit the corner beams 10 at right angles, to define the corners of the support matrix at the corner support beams rather than between them.

Figure 4:
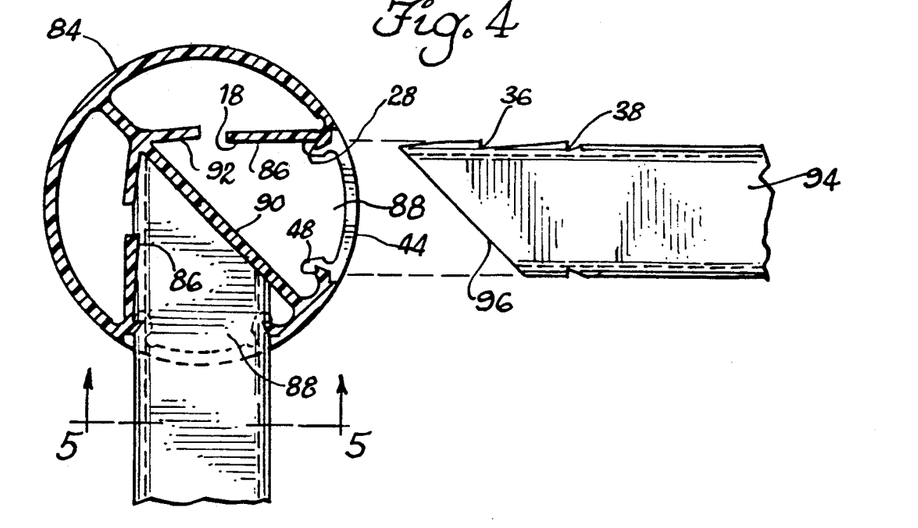
FIG. 4 is a horizontal section taken through a column which defines two continuous re-entrant slots to receive transverse members to define a lattice corner.

To accommodate this situation and in general to increase the versatility of the joint, a modification of the first embodiment of the invention is shown in cross-section in FIG. 4. This embodiment is substantially the version shown in FIGS. 1 through 3, with the slot 12 duplicated at right angles to the first slot.

As shown in FIG. 4, the main column 84 defines re-entrant slot walls 86 for two orthogonally related slots 88. The inside of the member is characterized by a transverse web 90 defining troughs 92 which are basically the same functionally as the troughs 20 in the first embodiment.

The second structural member, or transverse structural support 94 that is used with the post 84 has the same notches 38 of the member 30, and one of the notches 36. The notches engage the tangs 28 and 18, and the end of the beam is mitred as indicated at 96 to seat snugly in the trough 92 against the web 90. Cover plates 44 are inserted in the same fashion as in the embodiments of FIGS. 1-3.

Figure 21:
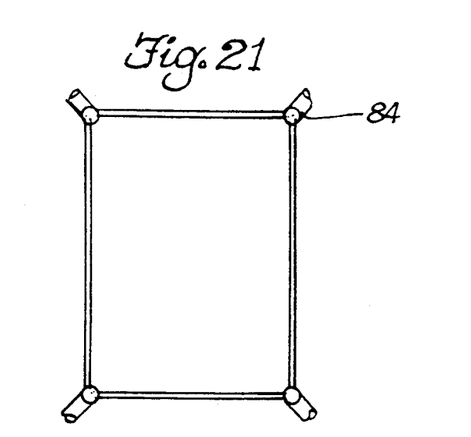

Conceivably, even more slots could be added around the circumference of the main structural member 84, although clearly there is a strength-to-weight penalty to be paid. This penalty is not great for the two orthogonal slot construction of FIG. 21 however, and in many instances would no doubt be outweighed by the structural versatility that this configuration provides.

This disclosure pertains principally to attachment of a connector brace from the interior lattice to the vertical, weight-supporting column structure. The interior of the lattice could be constructed according to the instant disclosure, but could also be constructed in a number of other ways according to techniques that have been developed and that work well for three dimensional orthogonally intersecting and meeting members that are each square or rectangular in cross-section, but preferably uniform from one to the next. Interlocking these orthogonal uniform members using these techniques is not a problem, as pointed out earlier. The instant disclosure bridges between the orthogonal grid on the one hand, which can be made extremely rigid without any glue, resin or fasteners, and on the other hand much larger diameter, ordinarily cylindrical columns which may not meet connecting braces orthogonally.

The jointing structure described herein is yet another advancement toward the development of techniques and structure to integrate composite pultrusion technology and structural members into the mainstream of large structure construction, replacing or supplementing steel, especially in applications such as high tension power wire support towers in which the qualities of electrical conductivity, weight and corrodibility of steel are definitely deterrents to its use.

It is hereby claimed:

1. A jointing system comprising:
    (a) an elongated first structural member comprising a pultruded composite column for use as a vertical structural support for a large structure, said first structural member having a substantially uniform pultrusion-formed cross-section;
    (b) a substantially longitudinal slot defined by said first structural member substantially along the entire length thereof and including two opposite re-entrant stabilizing walls being deeply re-entrant into said first structural member a distance at least on the order of half the thickness of said first structural member, said first structural member being resilient to permit the forced expansion said slot;
    (c) a second structural member having one end which is a seating end configured to be inserted into said slot and of width dimension greater than said slot such that upon forcing said end into said slot said slot expands to accept said seating end;
    (d) mutual detent means defined in said slot and in said seating end of said second structural member to substantially lock said structural members together when said seating end of said second member is inserted into said slot to expand said slot and snap said slot together around said seating end;
    (e) said slot having projecting edges and said two opposite re-entrant stabilizing walls along said projecting edges of said slot defining a continuation of said slot to orientationally stabilize said seating end when inserted into said slot.

2. Structure according to claim 1 wherein said stabilizing walls are at least slightly resilient and said mutual detent means comprises mating snap-in detents including facing inwardly-directed tangs defined by both of said stabilizing walls and mating grooves defined in said seating end to engage said tangs.

3. Structure according to claim 1 wherein said first structural member defines a substantially continuous seat in the interior thereof opposite said slot configured to seat said seating end and said seat together with said stabilizing walls defines a substantially continuous trough.

4. Structure according to claim 1 and including at least one slot cover member and retaining means to retain said slot cover member in at least a portion of said slot, said slot cover member being a structural member of adequate strength to fully support a second structural member resting on said slot cover member when same is vertically extended and seated in said slot.

5. Structure according to claim 4 wherein said structural members are pultruded composites.

6. Structure according to claim 5 wherein said jointing system includes said first structural member, and said second structural member is plural to define a plurality of second structural members, with each of the seating ends of said second structural members being seated in the slot of said first structural member, and continuously between each adjacent pair of said second structural members a cover member is seated in the slot defined by said first structural member to space and support said second structural members.

7. Structure according to claim 1 wherein said first structural member defines a second elongated slot substantially identical to, and parallel to, said first-mentioned slot.

8. Structure according to claim 7 wherein said slots face outwardly from said first structural member in mutually orthogonal directions.

9. Structure according to claim 8 wherein said structural members are both pultruded composites.

10. A tower comprising:
 (a) a plurality of substantially vertical elongated first structural members defining in platform the corners of a polygon;
 (b) each of said first structural members defining at least one substantially continuous longitudinal slot thereof;
 (c) a reinforcing truss structure defined between said first structural members and having outwardly extending second structural members with seating ends extending into the slots in said first structural members;
 (d) mutual detent means defined in said slots and in said seating ends of said second structural members to substantially lock said structural members together when said seating ends of said second structural members are inserted into said slot; and,
 (e) said first structural members each including two opposite re-entrant stabilizing walls along two sides of said respective slots being deeply re-entrant to substantially to a central portion of said first structural member to define a continuation of said slots orientationally stabilize said seating ends when inserted into said slot.

11. Structure according to claim 10 wherein said substantially longitudinal slots are defined substantially continuously along substantially the entire lengths of said first structural members and said first structural members have a substantially uniform cross-section by virtue of having been formed by being forced through a die.

12. Structure according to claim 11 wherein said stabilizing walls are at least slightly resilient and said mutual detent means comprises facing inwardly-directed tangs defined by both of said stabilizing walls, and mating groove in said seating ends.

* * * * *